(12) United States Patent
Dong et al.

(10) Patent No.: US 12,376,516 B2
(45) Date of Patent: *Aug. 5, 2025

(54) MOWER AND GARDEN TOOL

(71) Applicant: Greenworks (Jiangsu) Co., Ltd, Jiangsu (CN)

(72) Inventors: Jianhua Dong, Jiangsu (CN); Wanchun Jiao, Jiangsu (CN); Alexander Tyrling, Jonko (SE); Stefan La, Jonkoping (SE)

(73) Assignee: Greenworks (Jiangsu) Co., Ltd, Changzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/783,488

(22) Filed: Jul. 25, 2024

(65) Prior Publication Data

US 2024/0397858 A1  Dec. 5, 2024

Related U.S. Application Data

(63) Continuation of application No. 17/283,248, filed as application No. PCT/CN2019/111715 on Oct. 17, 2019, now Pat. No. 12,069,983.

(51) Int. Cl.
*A01D 34/69* (2006.01)
*A01D 34/00* (2006.01)
(Continued)

(52) U.S. Cl.
CPC .......... *A01D 34/69* (2013.01); *A01D 34/008* (2013.01); *A01D 34/6818* (2013.01); *A01D 2034/6843* (2013.01); *A01D 2101/00* (2013.01)

(58) Field of Classification Search
CPC ................ A01D 34/6818; A01D 34/69; A01D 2101/00; A01D 2034/6843
See application file for complete search history.

(56) References Cited

U.S. PATENT DOCUMENTS

2017/0367259 A1* 12/2017 Shaffer ................ B62B 5/0026
2018/0160622 A1*  6/2018 Pellenc ............... A01D 43/063
(Continued)

FOREIGN PATENT DOCUMENTS

| CN | 205510937 U | * | 8/2016 | |
| CN | 107323452 A | * | 11/2017 | ............ B60W 10/06 |
| CN | 108513790 A | * | 9/2018 | ............ A01D 34/68 |

OTHER PUBLICATIONS

Hu et al., Hybrid power vehicle and driving control method thereof, Nov. 7, 2017, EPO, CN 107323452 A, Machine Translation of Description (Year: 2017).*

(Continued)

*Primary Examiner* — James A English (57) ABSTRACT

A lawn mower includes a housing (1), a push rod connected with the housing, at least one front wheel mounted in front of the housing, at least one rear wheel mounted at the rear of the housing, a first electric motor driving the front wheel, a second electric motor driving the rear wheel, and a controller electrically connected to the first electric motor and the second electric motor, the controller is configured to turn-on or turn-off the first electric motor and/or the second motor. The lawn mower can be driven in two-wheel drive or four-wheel drive as required, which is convenient to operate and maintain.

18 Claims, 7 Drawing Sheets

(51) Int. Cl.
*A01D 34/68* (2006.01)
*A01D 101/00* (2006.01)

(56) References Cited

U.S. PATENT DOCUMENTS

2019/0343040 A1* 11/2019 Testolin ................. A01D 69/02
2021/0064036 A1* 3/2021 Muro ................... G05D 1/0212

OTHER PUBLICATIONS

Chen et al., Multifunctional handle for hay mower and hay mower with multifunctional handle, Sep. 11, 2018, EPO, CN 108513790 A, Machine Translation of Description (Year: 2018).*

Jiang, Drive arrangement and this drive arrangement's of adaptation lawn mower, Aug. 31, 2016, EPO, CN 205510937 U, Machine Translation of Description (Year: 2016).*

* cited by examiner

MOWER AND GARDEN TOOL

CROSS-REFERENCE TO RELATED APPLICATIONS

This application is a continuation Application of U.S. application Ser. No. 17/283,248 filed on Apr. 7, 2021, which is a National Phase Application of PCT Application No. PCT/CN2019/111715 filed on Oct. 17, 2019, which claims priority of Chinese patent application No. 201811172312.5, filed on Oct. 9, 2018, and entitled lawn mower, the entire contents of which are incorporated herein by reference.

TECHNICAL FIELD

The present disclosure relates to the technical field of garden machinery, and more particularly to a lawn mower.

BACKGROUND

A lawn mower is a common garden tool, and a traditional self-propelled lawn mower realizes self-propelled function by driving a front wheel or a rear wheel thereof through a speed reducer. When the self-propelled lawn mower needs to climb a slope during mowing grasses, a speed thereof will decrease or even the self-propelled lawn mower will stop. The reason for this is that a load of the self-propelled lawn mower becomes larger during climbing the slope, and a power of a self-propelled motor of the self-propelled lawn mower cannot meet the requirements for the load. However, if the power of the self-propelled motor of the self-propelled lawn mower is merely increased, when the self-propelled lawn mower travels on a flat ground, a required power for the self-propelled motor will be lower, and thus a maximum efficiency ratio of the self-propelled motor will not be achieved, thereby resulting in excessive loss and waste of energy.

In view of this, it is required to provide an improved lawn mower to solve the above problems.

SUMMARY

An objective of the disclosure is to provide a lawn mower with good energy saving effect and convenient operation.

The disclosure has following beneficial effects. For the lawn mower of the disclosure, the first control element is set to control the turning-on or turning-off of the first self-propelled motor, and the second control element is set to control the turning-on or turning-off of the second self-propelled motor, such that when the operation requirements can be met by driving a single self-propelled motor, only the first self-propelled motor is controlled to operate; while when the operation requirements cannot be met by driving a single self-propelled motor, the second self-propelled motor is further controlled to operate to realize four-wheel drive. Moreover, the first self-propelled motor and the second self-propelled motor may be separately controlled, therefore, the effect of saving energy is not only achieved, but it is also convenient for operation and maintenance.

DETAILED DESCRIPTION OF EMBODIMENTS

In order to make objects, technical solutions and advantages of the disclosure clearer, the disclosure will be described in detail with reference to accompanying drawings and specific embodiments.

Figure 1:
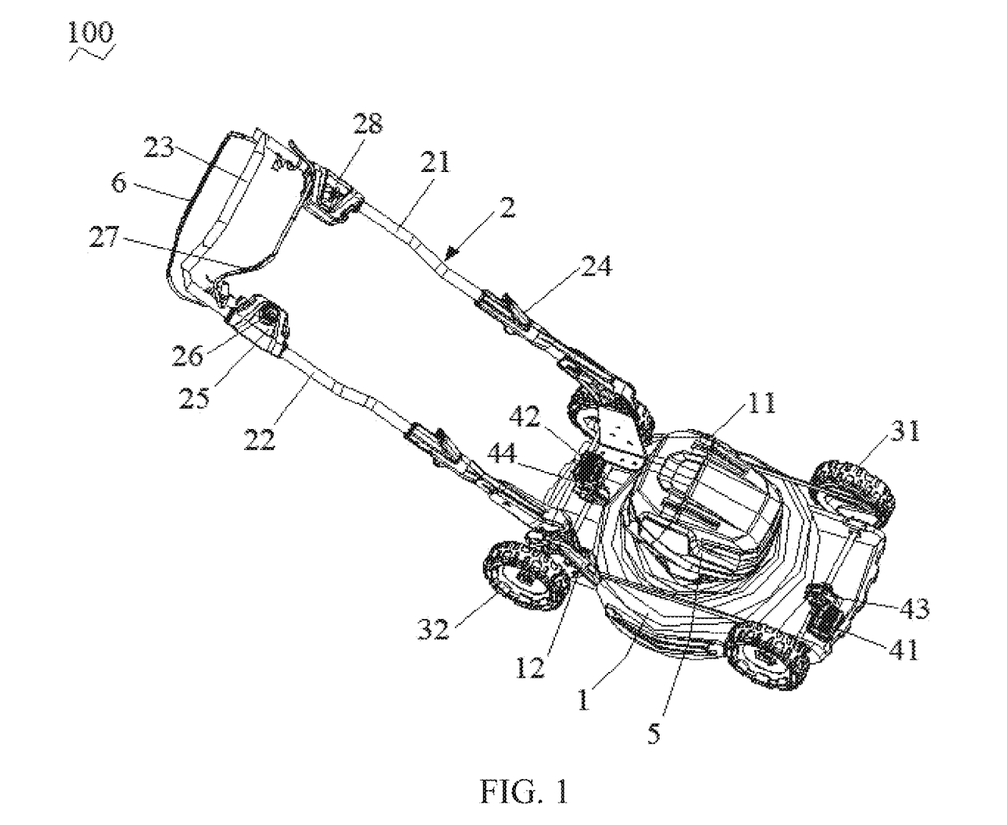
FIG. 1 is a schematic perspective view of a lawn mower according to a first embodiment of the disclosure.

Referring to FIG. 1, the disclosure provides a self-propelled lawn mower 100. The lawn mower 100 includes a housing 1, a push rod 2 connected to the housing 1, a traveling wheel supported the lawn mower 100, a self-propelled motor which is configured to drive the traveling wheel to self-propel, a control circuit board 5 which is configured to control turning-on and turning-off of the self-propelled motor and an enclosure which is assembled with the housing 1 (not shown).

A blade and a motor for driving the blade to rotate are arranged in the housing 1, a power assembly 11 is formed by the blade and the motor. The blade arranged at the bottom of the housing 1 is rotatable along a rotating shaft perpendicular to a ground to mow grasses on the ground. A power supply assembly (not shown) is also arranged in the housing 1, and the power supply assembly is configured to supply power to the lawn mower 100 to ensure that the grasses are mowed effectively.

The push rod 2 is U-shaped and include a first handle 21, a second handle 22, and a third handle 23. Specifically, the first handle 21 extends backward and upward along a rear portion of the housing 1, the third handle 23 is connected with the first handle 21 and the second handle 22, and the third handle 23 is located at the top of the push rod 2, such that an operator may stand behind the push rod 2 and grasp the third handle 23 of the push rod 2 to thereby operate the lawn mower 100. The first handle 21, the second handle 22 and the third handle 23 may be integrally formed, and may also be assembled and connected, which is not limited herein, as long as it is convenient to operate the lawn mower 100.

The first handle 21 and the second handle 22 are each provided with a folding structure 24, and the folding structure 24 is configured to adjust an angle of the push rod 2, thereby facilitating folding of the lawn mower 100. The housing 1 is also provided with a height adjustment assembly 12 for adjusting a height between the housing 1 and the ground to thereby adjust a mowing height.

A main knife switch box 25 is arranged a position on the second handle 22 close to the third handle 23. A turning-on switch (not shown), a turning-on button 26 and a return spring (not shown) are arranged in the main knife switch box 25. The turning-on switch is connected with the motor for turning-on the motor. The lawn mower 100 further includes a main knife switch pull rod 27 arranged close to the third handle 23, and the main knife switch pull rod 27 is arranged above the main knife switch box 25 and connected with the turning-on switch.

In a case that the blade of the lawn mower 100 is required to be turned-on, the turning-on button 26 is first pressed, the main knife switch pull rod 27 is then pulled to thereby enable the main knife switch pull rod 27 to fit with the third handle 23, enable the main knife switch pull rod 27 to pull the turning-on switch to turn-on the motor and drive the blade to rotate for performing a mowing process. In a case that the mowing process is finished, the main knife switch pull rod 27 is released, and the main knife switch pull rod 27 is restored to an initial position under the action of the return spring, and then the turning-on switch is turned-off and the blade stops rotating.

In order to turn-on the lawn mower 100 of the disclosure, it is required to press the turning-on button 26 first, and then pull the main knife switch pull rod 27. Through performing the above two actions, it is possible to prevent an accidental turning-on due to an inadvertently touch of the turning-on button 26, and thereby a safety factor of the lawn mower 100 is high.

The traveling wheel includes a pair of front traveling wheels 31 and a pair of rear traveling wheels 32. The self-propelled motor includes a first self-propelled motor 41 and a second self-propelled motor 42. The first self-propelled motor 41 is configured to drive the front traveling wheels 31 to self-propel. The second self-propelled motor 42 is configured to drive the rear traveling wheels 32 to self-propel. The first self-propelled motor 41 and the second self-propelled motor 42 are powered by the power supply assembly and electrically connected with the control circuit board 5 respectively. In the disclosure, the control circuit board 5 is a printed circuit board (PCB), and the first self-propelled motor 41 and the second self-propelled motor 42 are electrically connected to the PCB respectively, so that the turning-on and turning-off of the first self-propelled motor 41 and the second self-propelled motor 42 are controlled by the PCB.

It should be noted that the first self-propelled motor 41 is configured to drive the front traveling wheels 31 to self-propel, and the second self-propelled motor 42 is configured to drive the rear traveling wheels 32 to self-propel in the embodiment. Of course, the first self-propelled motor 41 can also be configured to drive the rear traveling wheels 32 to self-propel, and the second self-propelled motor 42 can be configured to drive the front traveling wheels 31 to self-propel, which is not limited herein.

The lawn mower 100 further includes a first speed reducing mechanism 43 connected with the first self-propelled motor 41 and a second speed reducing mechanism 44 connected with the second self-propelled motor 42. Clutches (not shown) are arranged in each of the first speed reducing mechanism 43 and the second speed reducing mechanism 44. The clutch of the first speed reducing mechanism 43 is configured to enable an output shaft of the first speed reducing mechanism 43 not to contact with a wheel shaft of each front traveling wheel 31 if the first self-propelled motor 41 is out of service, and the clutch of the second speed reducing mechanism 44 is configured to enable an output shaft of the second speed reducing mechanism 44 not to contact with a wheel shaft of each rear traveling wheel 32 if the second self-propelled motor 42 is out of service. Therefore, in a case that the first self-propelled motor 41 and/or the second self-propelled motor 42 are/is in a turned-off state, even if the lawn mower 100 is in moving state, the first self-propelled motor 41 and/or the second self-propelled motor 42 will not be reversely driven by the front traveling wheels 31 and/or the rear traveling wheels 32. The clutch is common in a prior art, and a specific structure and a power principle thereof may be referred to a patent application No. CN201721623687.X, it will not be described in detail herein.

In the disclosure, the first speed reducing mechanism 43 is arranged close to the first self-propelled motor 41, each of the first speed reducing mechanism 43 and the first self-propelled motor 41 is arranged close to the front traveling wheels 31. The second speed reducing mechanism 44 is arranged close to the second self-propelled motor 42, each of the second speed reducing mechanism 44 and the second self-propelled motor 42 is arranged close to the rear traveling wheels 32. With this arrangement, it is facilitated that the control circuit board 5 controls the turning-on or turning-off of the corresponding first self-propelled motor 41 and second self-propelled motor 42, and then drives the front traveling wheels 31 to self-propelled using the first reducing mechanism 43 and the rear traveling wheels 32 to self-propelled using the second reducing mechanism 44.

The lawn mower 100 further includes a first control element and a second control element. Specifically, the first control element is connected with the control circuit board 5 and configured to control the control circuit board 5 to turn-on or turn-off the first self-propelled motor 41, and the second control element is configured to control the control circuit board 5 to turn-on or turn-off the second self-propelled motor 42.

Specifically, the first control element is a self-propelled pull rod 6, which is arranged close to the top of the push rod 2 and the third handle 23. The first self-propelled motor 41 is turned-on, if the self-propelled pull rod 6 is pulled so as to fit the third handle 23. The self-propelled pull rod 6 returns to an initial position thereof and the first self-propelled motor 41 is turned-off, if the self-propelled pull rod 6 is released. Of course, in order to increase a safety of the lawn mower, it is also expected that additional actions can be performed besides pulling the self-propelled pull rod 6 to realize the turning-on and turning-off of the first self-propelled motor 41.

The main knife switch pull rod 27 is arranged on a side of the third handle 23, and the self-propelled pull rod 6 is arranged on the other side of the third handle 23. With this arrangement, when the lawn mower 100 is turned-on, the main knife switch pull rod 27 and the self-propelled pull rod 6 is simultaneously pulled to fit with the third handle 23, thereby facilitating grasping of the main knife switch pull rod 27 and the self-propelled pull rod 6 by the operator.

There are several manners for the second control element to control the turning-on or turning-off of the second self-propelled motor 42, and three of which will be described through three embodiments in detail in the following description, but it will not be limited herein.

Figure 2:
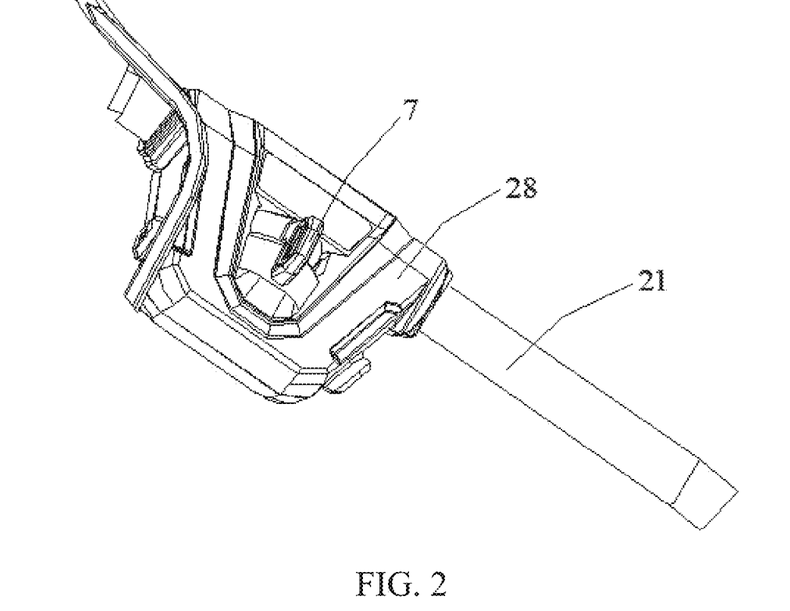
FIG. 2 is a schematic structural view of a self-propelled switch box and a push button of FIG. 1.
Figure 3:
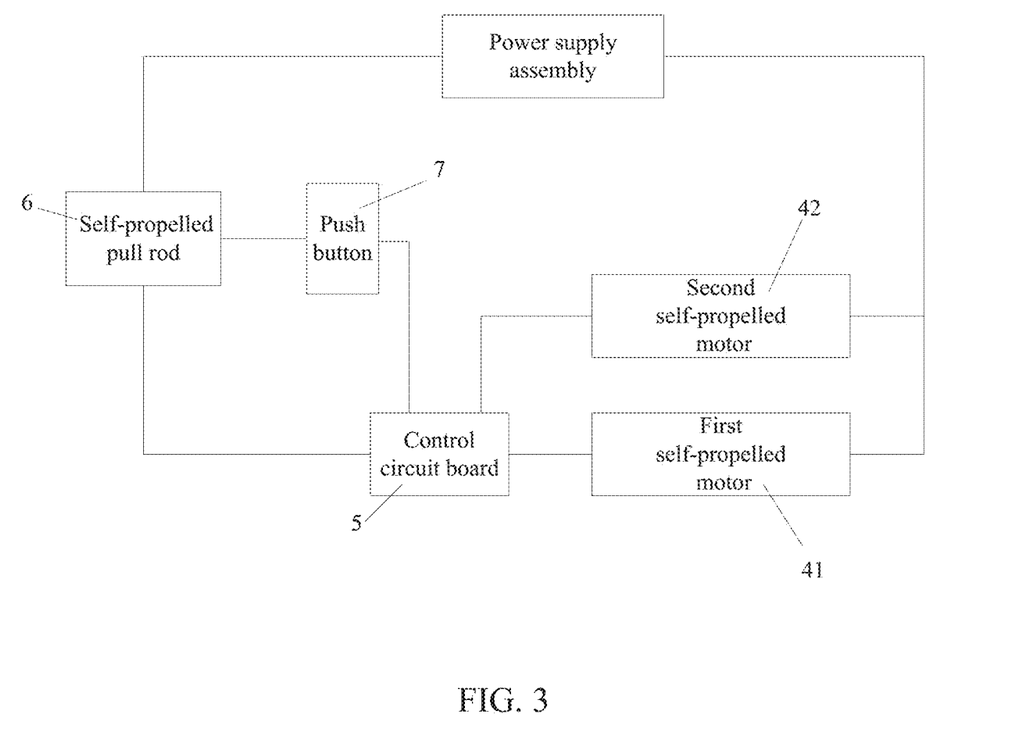
FIG. 3 is a circuit view illustrating an operation principle of the lawn mower shown in FIG. 1.

Referring to FIGS. 1 to 3, a lawn mower 100 is shown according to the first embodiment of the disclosure. In the embodiment, the second control element is a push button 7 arranged close to the top of the push rod 2, which is connected with the control circuit board 5. When the push button 7 is pushed backward or forward, the control circuit board 5 is controlled to correspondingly turn-on or turn-off the second self-propelled motor 42.

Specifically, the first handle 21 is provided with a self-propelled switch box 28, and the push button 7 is disposed on the self-propelled switch box 28. When the push button 7 is dialed by the operator forward (or backward), the control circuit board 5 controls the second self-propelled motor 42 to power on and thereby controls the turning-on of the second self-propelled motor 42. When the push button 7 is pushed backward (or forward), the control circuit board 5 controls the second self-propelled motor 42 to turn-off and thereby controls the turning-off of the second self-propelled motor 42.

In the embodiment, when the lawn mower 100 is traveling, the self-propelled pull rod 6 is pulled to enable the self-propelled pull rod 6 to fit with the third handle 23, in this case, the first self-propelled motor 41 is turned-on to drive the front traveling wheels 31 to self-propel through the first speed reducing mechanism 43, and the second self-propelled motor 42 is in a standby state. It should be noted that, in the embodiment, the premise that the second self-propelled motor 42 can be turned-on is that the first self-propelled motor 41 is in a turned-on state. That is to say, when the first self-propelled motor 41 is turned-off, the second self-propelled motor 42 will not be turned-on even if the push button 7 is in a turning-on state. Of course, in other embodiments, the operations of the first self-propelled motor 41 and the second self-propelled motor 42 may be independent of each other.

When the lawn mower 100 is traveling on a flat ground, the operation requirements can be met if the two front traveling wheels 31 are driven merely by the first self-propelled motor 41 to self-propel. In case of thick grasses and a large climbing resistance, the push button 7 is required to be pushed, so as to turn-on the second self-propelled motor 42 to thereby drive the rear traveling wheels 32 to self-propel through the second reducing mechanism 44, thereby realizing four-wheel drive. Conversely, when a resistance on the flat ground is low or the lawn mower 100 is traveling downhill, the second self-propelled motor 42 may be turned-off by using the push button 7, thereby effectively saving electric energy and prolonging the endurance of the lawn mower 100. Further, if a self-propelled speed of the lawn mower 100 is still too high in this case, the operator may turn-off (i.e., release) the self-propelled pull rod 6 to turn off the first self-propelled motor 41 to further save electric energy.

Figure 4:
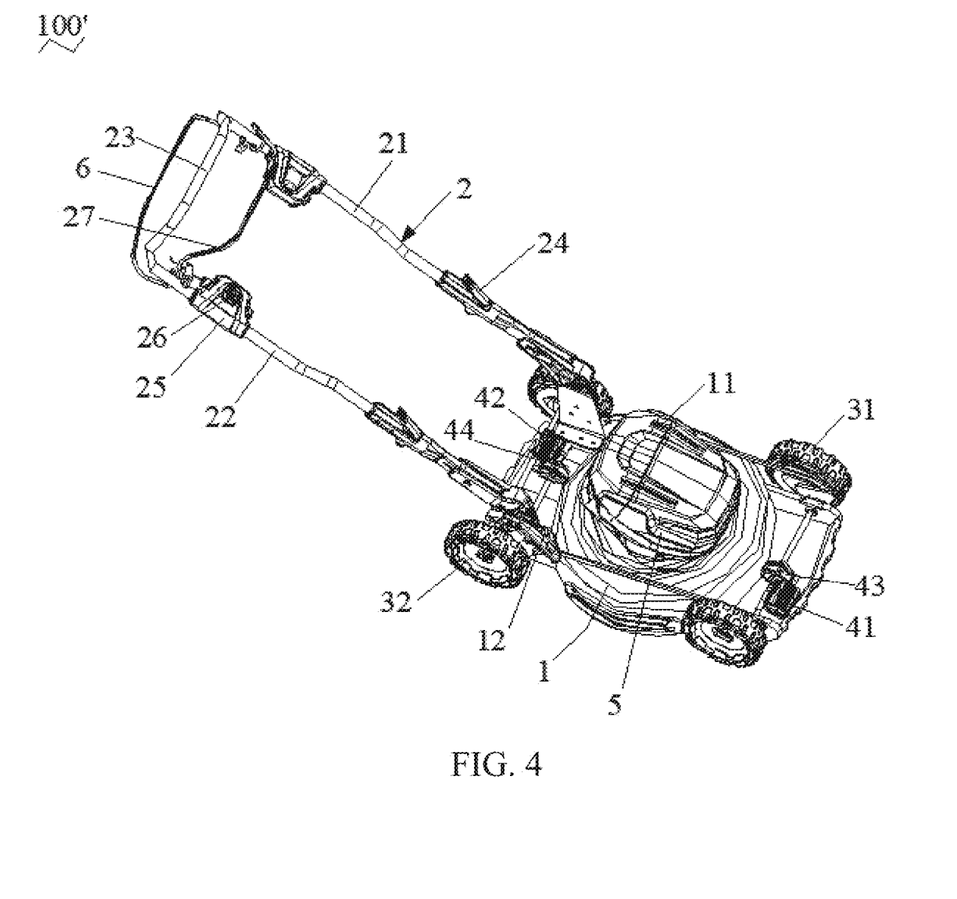
FIG. 4 is a schematic perspective view of a lawn mower according to a second embodiment of the disclosure.
Figure 5:
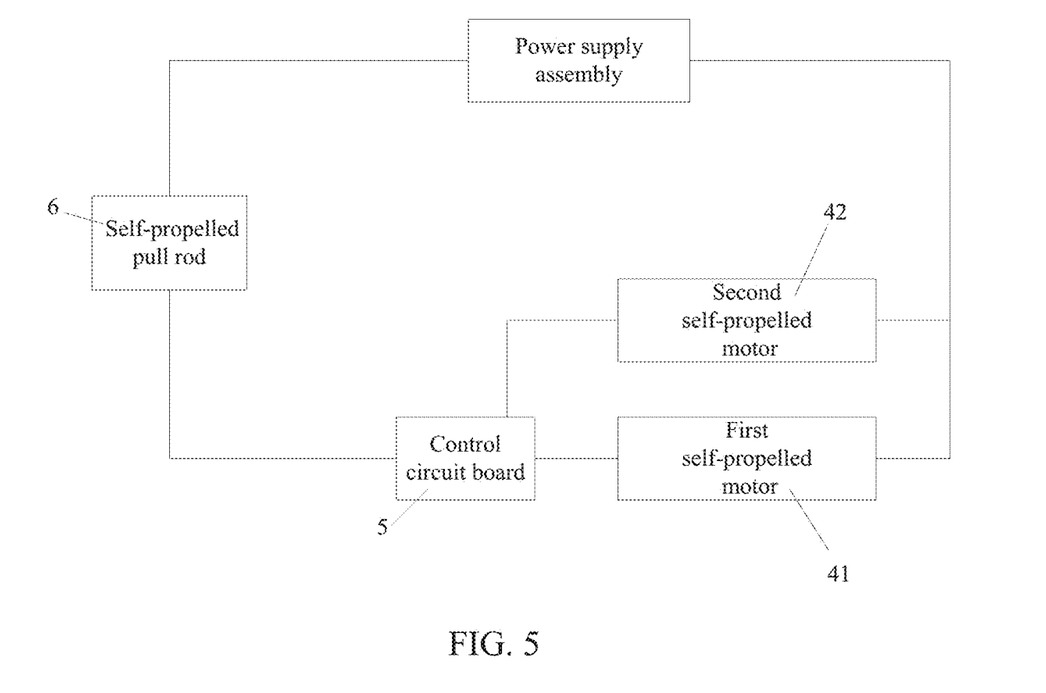
FIG. 5 is a circuit view illustrating an operation principle of the lawn mower shown in FIG. 4.

Referring to FIGS. 4 to 5, a lawn mower 100' is shown according to the second embodiment of the disclosure. In the embodiment, the second control element is a detection module (not shown), which is arranged on the control circuit board 5 and configured to detect a power of the first self-propelled motor 41, comparing the power with a set value to determine whether the second self-propelled motor 42 needs to be turned-on or turned-off.

Specifically, since there is a small change in a power supply voltage of the first self-propelled motor 41, the power of the first self-propelled motor 41 can be calculated by the detection module according to a current of the first self-propelled motor 41 detected by the detection module. Further, the detection module transmits the calculated power of the first self-propelled motor 41 to the control circuit board 5, and then the control circuit board 5 controls the second self-propelled motor 42 to turn-on or turn-off according to the received power of the first self-propelled motor 41. In the preferred embodiment, the control circuit board 5 controls the second self-propelled motor 42 to turn-on when the power of the first self-propelled motor 41 is higher than an upper limit of the set value, while the control circuit board 5 may control the second self-propelled motor 42 to turn-off when the power of the first self-propelled motor 41 is smaller than a lower limit of the set value. The upper limit of the set value may be in a range from 300 Watts (W) to 350 W, and preferably 320 W. The lower limit of the set value may be in a range from 200 W to 250 W, and preferably 240 W.

In the embodiment, when the lawn mower 100' is traveling, the self-propelled pull rod 6 is pulled to enable the self-propelled pull rod 6 to fit with the third handle 23, in this case, the first self-propelled motor 41 is turned-on to drive the front traveling wheels 31 to self-propel through the first speed reducing mechanism 43, and the second self-propelled motor 42 is in a standby state.

When the lawn mower 100' is traveling on a flat ground, the power of the first self-propelled motor 41 is small due to a small resistance, therefore, the operation requirements can be met if the two front traveling wheels 31 are driven merely by the first self-propelled motor 41 to self-propel.

In case of thick grasses and a large climbing resistance, a self-propelled load of the lawn mower 100' is large. In this case, if the detection module detects that the power of the first self-propelled motor 41 is large and exceeds the upper limit of the set value, the second self-propelled motor 42 is turned-on to drive the rear traveling wheels 32 to self-propel through the second speed reducing mechanism 44, thereby realizing four-wheel drive, in turn, reducing a running power of the first self-propelled motor 41 and avoiding overload of the first self-propelled motor 41.

When the lawn mower 100' is traveling downhill, the self-propelled load of the lawn mower 100' is small due to a small resistance. In this case, if the detection module detects that the power of the first self-propelled motor 41 is small and smaller than the lower limit of the set value, the second self-propelled motor 42 is turned-off to enable the efficiency of the first self-propelled motor 41 in a better state. Further, if the self-propelled speed of the lawn mower 100' is still too high in this case, the operator may turn-off (i.e., release) the self-propelled pull rod 6 to turn-off the first self-propelled motor 41, thereby saving electric energy and prolonging the endurance of the lawn mower 100'.

Figure 6:
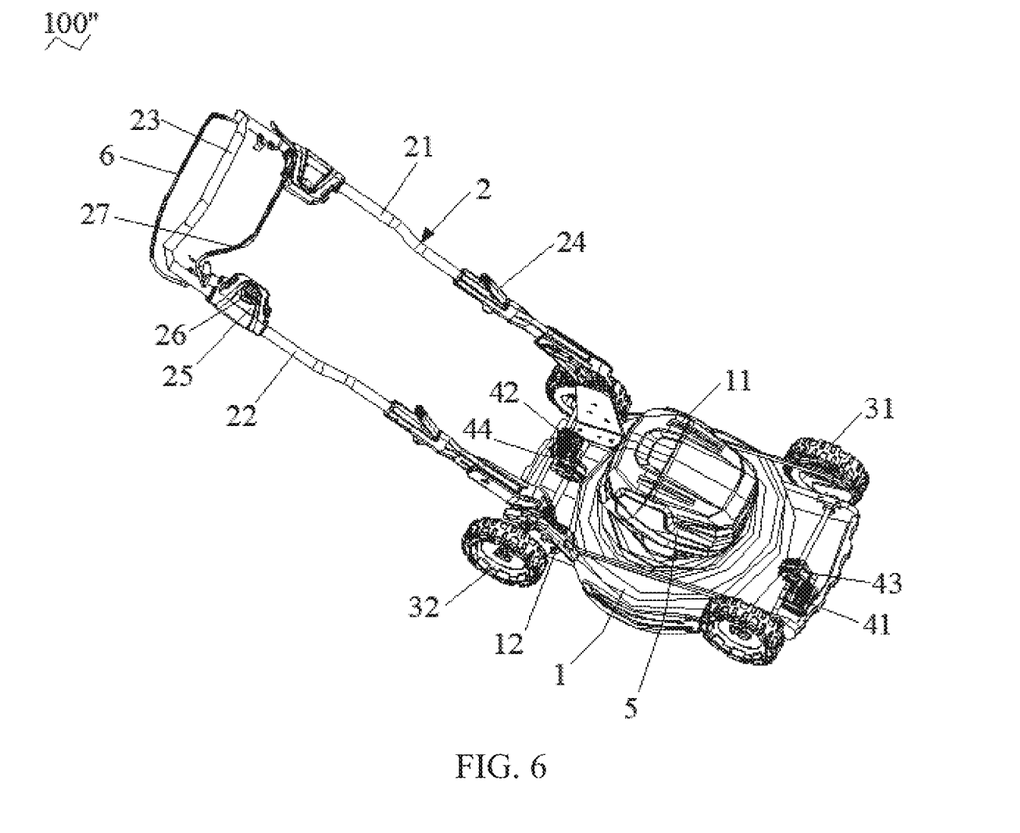
FIG. 6 is a schematic perspective view of a lawn mower according to a third embodiment of the disclosure.
Figure 7:
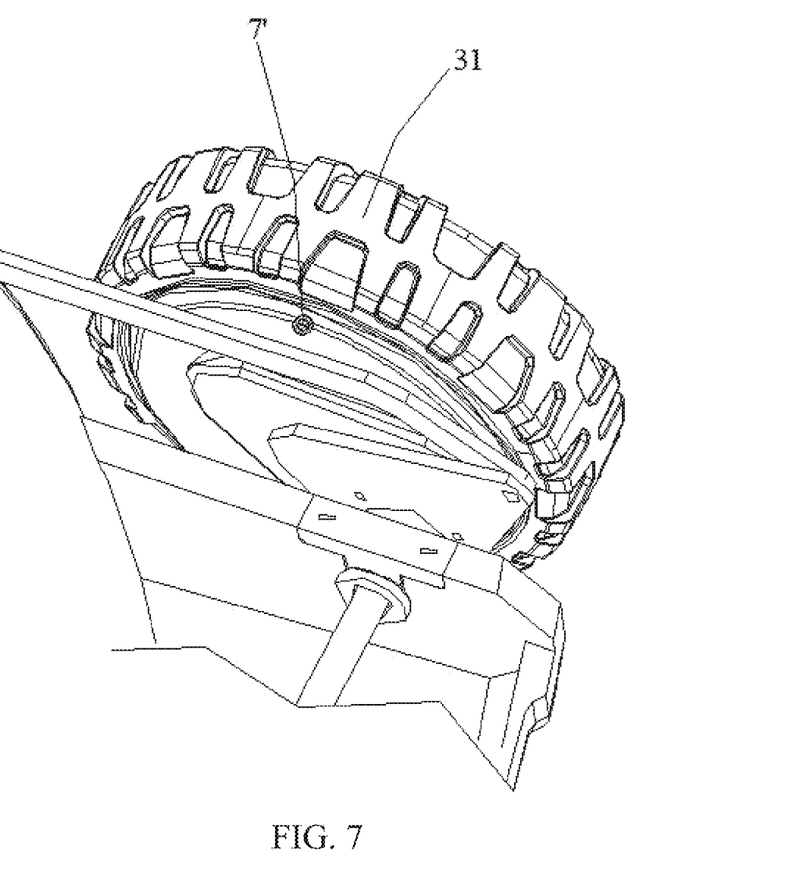
FIG. 7 is a schematic structural diagram of a front traveling wheel provided with an angular velocity sensor in FIG. 6.
Figure 8:
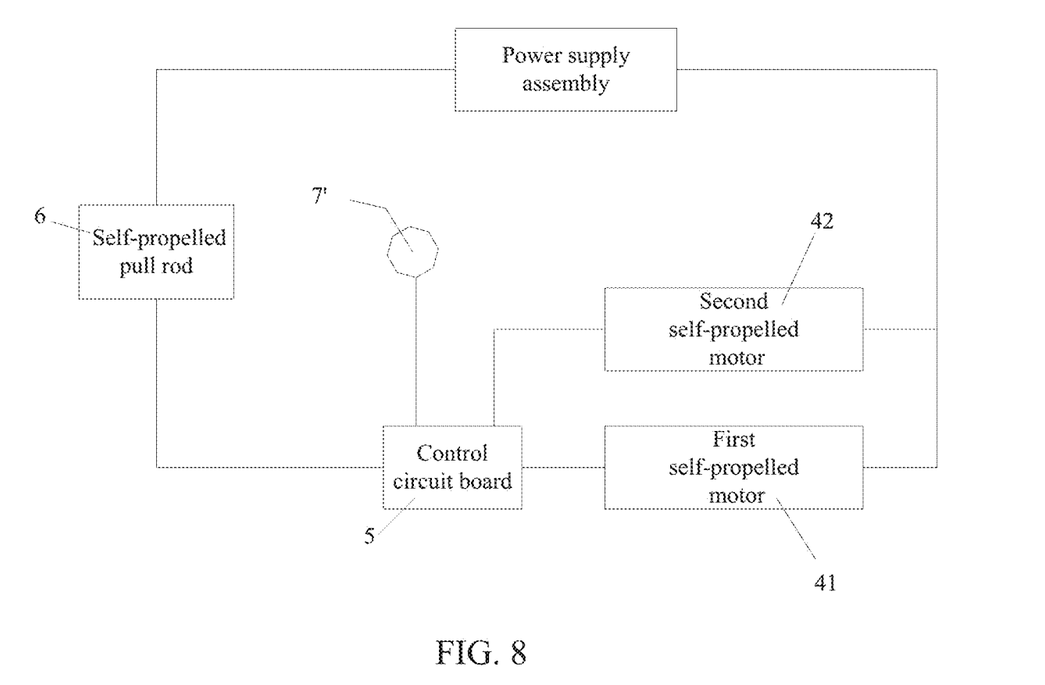
FIG. 8 is a circuit view illustrating an operation principle of the lawn mower shown in FIG. 6.

Referring to FIGS. 6 to 8, a lawn mower 100" is shown according to the third embodiment of the disclosure. In the embodiment, the second control element is an angular velocity sensor 7', which is arranged on the wheel shaft of each of the front traveling wheels 31 or the rear traveling wheels 32 and configured to transmit current angular velocity information of the corresponding traveling wheel to the control circuit board 5 in real time, and the control circuit board 5 determines whether the second self-propelled motor 42 needs to be turned-on or turned-off according to the received angular velocity information.

Specifically, since a size of the traveling wheels is fixed, the control circuit board 5 can calculate a current traveling speed of the lawn mower 100" according to the angular velocity information of the traveling wheels, compare the current traveling speed with a set value. Specifically, if the current traveling speed of the lawn mower 100" is smaller than a lower limit of a set value, the control circuit board 5 controls the second self-propelled motor 42 to turn-on; while if the current traveling speed of the lawn mower 100" is higher than an upper limit of the set value, the control circuit board 5 controls the second self-propelled motor 42 to turn-off. The upper limit of the set value is in a range from 1.4 meters per second (m/s) to 2 m/s, and preferably 1.5 m/s; The lower limit of the set value is in a range from 0 to 1 m/s, preferably 0.5 m/s.

In the embodiment, when the lawn mower 100" is traveling, the self-propelled pull rod 6 is pulled to enable the self-propelled pull rod 6 to fit with the third handle 23, in this case, the first self-propelled motor 41 is turned-on to drive the front traveling wheels 31 to self-propel through the first speed reducing mechanism 43, and the second self-propelled motor 42 is in a standby state.

When the lawn mower 100" is traveling on a flat ground, a traveling speed of the lawn mower 100" is between the upper limit and the lower limit of the set value, therefore, the operation requirements can be met if the two front traveling wheels 31 are driven merely by the first self-propelled motor 41 to self-propel.

In case of thick grasses and a large climbing resistance, the traveling speed of the lawn mower 100" is reduced. In this case, if the control circuit board 5 calculates that the traveling speed of the lawn mower 100" is reduced and smaller than the lower limit of the set value, the second self-propelled motor 42 is turned-on to drive the rear traveling wheels 32 to self-propel through the second deceleration mechanism 44, thereby realizing four-wheel drive, and enabling the traveling speed of the lawn mower 100" at a normal level.

When the lawn mower 100" is traveling downhill, a self-propelled speed of the lawn mower 100" is accelerated due to a small resistance. In this case, if the control circuit board 5 calculates that the traveling speed of the lawn mower 100" is faster and higher than the upper limit of the set value, the second self-propelled motor 42 is turned-off to enable the traveling speed of the lawn mower 100" at the normal level. Further, if the self-propelled speed of the lawn mower 100 "is still too high in this case, the operator may turn-off (i.e., release) the self-propelled pull rod 6 to turn-off the first self-propelled motor 41, thereby saving electric energy and prolonging the endurance of the lawn mower 100".

Combined with the above three embodiments, the following conclusions can be drawn. When the operation requirements can be met by driving a single self-propelled motor, only the first self-propelled motor 41 operates to realize the self-propelled of the two front traveling wheels 31; while when the operation requirements cannot be met by driving a single self-propelled motor, the second self-propelled motor 42 further operates to realize four-wheel drive. The first self-propelled motor 41 and the second self-propelled motor 42 may be separately controlled, therefore, the effect of saving energy is not only achieved, but it is also convenient for operation and maintenance.

The enclosure may snap-fit with the housing 1, and is configured to cover the housing 1, the power assembly 11, the first self-propelled motor 41, the second self-propelled motor 42, the control circuit board 5 and the like, so as to prevent the power assembly, the power assembly 11, the first self-propelled motor 41, the second self-propelled motor 42 and the control circuit board 5 from being damaged by dust, water stains, etc., and to ensure that the lawn mowers 100, 100' and 100" can operate safely and stably, thereby prolonging the service life of the lawn mowers 100, 100' and 100".

In summary, for the lawn mowers 100, 100', and 100" of the disclosure, the first control element is set to control the turning-on or turning-off of the first self-propelled motor 41, and the second control element is set to control the turning-on or turning-off of the second self-propelled motor 42, such that when the operation requirements can be met by driving a single self-propelled motor, only the first self-propelled motor 41 is controlled to operate so as to realize two-wheel drive; while when the operation requirements cannot be met by driving a single self-propelled motor, the second self-propelled motor 42 may be further controlled to operate to realize four-wheel drive. Moreover, the first self-propelled motor 41 and the second self-propelled motor 42 may be separately controlled, therefore, the effect of saving energy is not only achieved, but it is also convenient for operation and maintenance.

The above embodiments are only used to illustrate but not limit the technical solutions of the disclosure. Although the disclosure has been described in detail with reference to preferred embodiments, it should be understood by those skilled in the art that the technical solutions of the disclosure can be modified or equivalently replaced without departing from the spirit and scope of the technical solutions of the disclosure.

What is claimed is:

1. A mower, comprising
a housing;
a push rod connected with the housing;
at least one front wheel mounted in front of the housing;
at least one rear wheel mounted at the rear of the housing;
a first electric motor driving the front wheel;
a second electric motor driving the rear wheel; and
a controller electrically connected to the first electric motor and the second electric motor;
wherein the controller is configured to turn-on or turn-off the first electric motor and/or the second motor;
the mower is configured to be switchable between a two-wheel drive operation state and a four-wheel drive operation state; and
the first electric motor and the second electric motor are powered by at least one battery arranged on the housing.

2. The mower according to claim 1, further comprising a first control element, the first control element is configured to send a signal to the controller to control the first electric motor.

3. The mower according to claim 2, further comprising a second control element, the second control element is configured to send a signal to the controller to control the second electric motor.

4. The mower according to claim 3, wherein the first control element and the second control element are mounted on the push rod.

5. The mower according to claim 4, wherein the controller is configured to:
drive the mower by activating the first electric motor if the controller receives an active signal from the first control element.

6. The mower according to claim 5, wherein the controller is configured to:
drive the mower by activating the first electric motor and the second electric motor if controller receives an active signal from the first control element and the second control element.

7. The mower according to claim 6, wherein the first control element comprises a self-propelled pull rod.

8. The mower according to claim 7, wherein the self-propelled pull rod is pivotably mounted on the push rod.

9. The mower according to claim 7, wherein the second control element comprises a button.

10. The mower according to claim 9, wherein the button is mounted on the push rod.

11. The mower according to claim 7, wherein the second control element is arranged on the controller and configured to detect a power of the first electric motor.

12. The mower according to claim 7, wherein the second control element is an angular velocity sensor arranged on a wheel shaft of the wheels.

13. The mower according to claim 7, wherein the front wheel and the rear wheel are driven by the first electric motor and a second electric motor through a first speed reducing mechanism and a second speed reducing mechanism respectively.

14. The mower according to claim 13, wherein the first speed reducing mechanism and the second speed reducing mechanism are equipped with a clutch.

15. The mower according to claim 1, wherein the mower comprises a pair of front wheels and a pair of rear wheels.

16. The mower according to claim 1, wherein the push rod is U-shaped and comprises a first handle, a second handle and a third handle.

17. A garden tool, comprising:
a housing;
a push rod connected with the housing;
a pair of front wheels mounted in front of the housing;
a pair of rear wheels mounted at the rear of the housing;
a first electric motor driving the front wheels;
a second electric motor driving the rear wheels;
at least one battery powering the first and second electric motor; and
a controller electrically connected to the first electric motor and the second electric motor;
wherein the controller is configured to turn-on or turn-off the first electric motor and/or the second motor; and
the garden tool is configured to be switchable between a two-wheel drive operation state and a four-wheel drive operation state.

18. The garden tool according to claim 17, further comprising a power assembly mount on the housing, the battery is mounted on the power assembly.

* * * * *

UNITED STATES PATENT AND TRADEMARK OFFICE
CERTIFICATE OF CORRECTION

| | | |
|---|---|---|
| PATENT NO. | : 12,376,516 B2 | Page 1 of 1 |
| APPLICATION NO. | : 18/783488 | |
| DATED | : August 5, 2025 | |
| INVENTOR(S) | : Jianhua Dong et al. | |

It is certified that error appears in the above-identified patent and that said Letters Patent is hereby corrected as shown below:

On the Title Page

Item (30), insert the following Foreign Application Priority Data:
--October 9, 2018 (CN)........... 201811172312.5--

Signed and Sealed this
Second Day of December, 2025

John A. Squires
*Director of the United States Patent and Trademark Office*